United States Patent
Zisimopoulos et al.

(10) Patent No.: US 11,564,267 B2
(45) Date of Patent: Jan. 24, 2023

(54) RADIO ACCESS TECHNOLOGY CAPABILITY SIGNALING

(71) Applicant: QUALCOMM Incorporated, San Diego, CA (US)

(72) Inventors: Haris Zisimopoulos, London (GB); Miguel Griot, La Jolla, CA (US); Sebastian Speicher, Wallisellen (CH)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/888,152

(22) Filed: May 29, 2020

(65) Prior Publication Data
US 2020/0404720 A1 Dec. 24, 2020

(30) Foreign Application Priority Data
Jun. 18, 2019 (GR) .............................. 20190100263

(51) Int. Cl.
*H04W 76/11* (2018.01)

(52) U.S. Cl.
CPC .................................. *H04W 76/11* (2018.02)

(58) Field of Classification Search
CPC . H04W 36/08; H04W 72/0453; H04W 76/40; H04W 88/08; H04W 88/085;
(Continued)

(56) References Cited

U.S. PATENT DOCUMENTS 9,084,169 B2 * 7/2015 Cui .................... H04W 36/08
2018/0302785 A1 * 10/2018 Larmo .................. H04W 8/24
(Continued)

OTHER PUBLICATIONS

3GPP TR 23.743 V16.0.0 (Mar. 2019): "3GPP TR 23.743 V16.0.0 (Mar. 2019), 3rd Generation Partnership Project, Technical Specification Group Services and System Aspects, Study on optimisations on UE Radio Capability Signalling (Release 16)", 3GPP Standard, Technical Report, 3GPP TR 23.743, 3rd Generation Partnership Project (3GPP), Mobile Competence Centre, 650, Route Des Lucioles, F-06921 Sophia-Antipolis Cedex, France, No. V16.0.0, Mar. 28, 2019 (Mar. 28, 2019), XP051722959, pp. 1-56, [retrieved on Mar. 28, 2019], p. 10, chapter 6.1 p. 15, chapter 6.2.4.3.

(Continued)

*Primary Examiner* — Kwasi Karikari
(74) *Attorney, Agent, or Firm* — Harrity & Harrity, LLP

(57) ABSTRACT

A method, an apparatus, and/or a computer program product for wireless communication are provided. Radio capability signaling (RACS) optimization for the radio access technology (RAT) may be deployed for some user equipments (UEs) in a network to reduce a signaling overhead associated with identifying UE radio capabilities. The UEs may be configured with a set of UE radio capability identifiers, such as a UE radio capability identifier for a narrowband (NB) RAT, a UE radio capability identifier for a non-NB RAT, and/or the like. A UE may provide a single UE radio capability identifier corresponding to a type of RAT to which the UE is to connect. The BS may determine that the UE supports RACS optimization for the RAT. If the UE does not provide the UE radio capability identifier, the BS may infer that the UE does not support RACS optimization.

30 Claims, 11 Drawing Sheets

(58) Field of Classification Search
CPC ..... H04W 92/20; H04W 12/06; H04W 24/02; H04W 72/1231; H04W 72/1284; H04W 72/1289
See application file for complete search history.

(56) References Cited

U.S. PATENT DOCUMENTS

| | | | | |
|---|---|---|---|---|
| 2019/0313239 | A1* | 10/2019 | Horn | H04L 5/14 |
| 2019/0363843 | A1* | 11/2019 | Gordaychik | H04L 1/1854 |
| 2020/0275323 | A1* | 8/2020 | Wu | H04W 36/0058 |
| 2020/0351762 | A1* | 11/2020 | Casati | H04W 60/04 |

OTHER PUBLICATIONS

Ericsson: "EPS Architecture Supporting RACS", 3GPP Draft, 3GPP TSG-SA WG2 Meeting #133, S2-1906356, 23401_CR3510R1_RACS_(REL-16)_S2-1906356_RACS_ARCHITECTURE_23401, 3rd Generation Partnership Project (3GPP), Mobile Competence Centre, 650, Route Des Lucioles, F-06921 Sophia-Antipolis, vol. SA WG2, No. Reno, Nevada, USA, May 13, 2019-May 17, 2019 May 29, 2019 (May 29, 2019), XP051743281, 7 Pages, Retrieved from the Internet: URL:http://www.3gpp.org/ftp/tsg%5FSA/TSG%5FSA/TSGS%5F84/Docs/SP%2D190425%2Ezip [retrieved on May 29, 2019].

International Search Report and Written Opinion—PCT/US2020/035536—ISA/EPO—dated Sep. 24, 2020.

Qualcomm Incorporated et al., "Adds UE Radio Capability ID in Signalling Procedures", 3GPP Draft, 3GPP TSG-SA WG2 Meeting #133, S2-1906385, 23401_CR3503R3_RACS_(REL-16)_S2-1906385-23401-RACS ProceduresR10, 3rd Generation Partnership Project (3GPP), Mobile Competence Centre, 650, Route Des Lucioles, F-06921 Sophia-Antipolis, vol. SA WG2, No. Reno, NV, USA, May 13, 2019-May 17, 2019 May 29, 2019 (May 29, 2019), XP051748994, 66 Pages, Retrieved from the Internet: URL:http://www.3gpp.org/ftp/Meetings%5F3GPP%5FSYNC/SA/Docs/SP%2D190425%2Ezip [retrieved on May 29, 2019], pp. 17-29, chapter 5.3.3 11 Tracking Area Update procedure.

* cited by examiner

RADIO ACCESS TECHNOLOGY CAPABILITY SIGNALING

CROSS-REFERENCE TO RELATED APPLICATION

This Patent Application claims priority to Greek Patent Application No. 20190100263, filed on Jun. 18, 2019, entitled "RADIO ACCESS TECHNOLOGY CAPABILITY SIGNALING," and assigned to the assignee hereof. The disclosure of the prior Application is considered part of and is incorporated by reference into this Patent Application.

BACKGROUND

Field

Aspects of the present disclosure generally relate to wireless communication and to techniques and apparatuses for radio access technology capability signaling.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New Radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using OFDM with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

SUMMARY

In some communications systems, such as New Radio (NR), a UE, such as a narrowband (NB) UE, may signal capability information to a BS. For example, the UE may indicate that the UE is able to connect to a wideband evolved universal mobile telecommunications system (UMTS) terrestrial radio access (WB-E-UTRA) radio access technology (RAT), an NR RAT, a narrowband Internet of Things (NB-IoT) RAT, and/or the like. However, signaling UE radio capabilities to a BS may result in excessive overhead signaling, especially for NB-IoT RATS, which may have a limited bitrate. As a result, the UE may use radio capability signaling (RACS) optimization to signal radio capability information. For example, the UE may transmit a non-access stratum (NAS) identifier, such as a UE radio capability identifier, which may correspond to a set of radio capabilities of the UE.

In some cases, a UE may support RACS optimization and may support only an NB-IoT RAT. In other cases, a UE may support RACS optimization and may support an NB-IoT RAT and another RAT (e.g., a non-NB RAT, such as a WB-E-UTRA RAT). In still other cases, a legacy UE may be deployed that does not support RACS optimization. Thus, some aspects described herein enable UE radio capability signaling for different types of UEs deployed in a network. For example, a UE may be configured with at least one radio capability identifier, and may signal a radio capability identifier when initiating a connection to a BS (e.g., during an attach procedure, a tracking area update procedure, or a registration procedure).

In this case, the UE may be configured with a first UE radio capability identifier for an NB-IoT RAT and may signal the first UE radio capability identifier when initiating a connection to a BS providing an NB-IoT RAT. In contrast, the UE may be configured with a second UE radio capability identifier for a WB-E-UTRA RAT, and may signal the second UE radio capability identifier when initiating a connection to a BS providing a WB-E-UTRA RAT. In further contrast, a UE that does not support RACS optimization may not transmit any UE radio capability identifier, and the BS may be configured to determine that the UE does not support RACS optimization based at least in part on the UE not transmitting any UE radio capability identifier. In this way, signaling may be reduced relative to transmitting all radio capability identifiers or other information identifying all radio capabilities of a UE. Moreover, legacy operations may be supported by enabling a BS to determine that a UE does not support RACS optimization when the UE does not transmit a radio capability identifier.

In an aspect of the disclosure, a method, a UE, a base station, an apparatus, and a computer program product are provided.

In some aspects, an NB UE for wireless communication may include memory and one or more processors operatively coupled to the memory. The memory and the one or more processors may be configured to initiate a communication session establishment procedure to connect using a RAT; determine, in connection with the communication session establishment procedure, whether the UE supports RACS optimization for the RAT; and transmit, during signaling of the communication session establishment procedure, a communication session establishment message including a UE radio capability identifier corresponding to the RAT based at least in part on a result of determining whether the UE supports RACS optimization for the RAT.

In some aspects, a method of wireless communication, performed by a UE, may include initiating a communication session establishment procedure to connect using a RAT; determining, in connection with the communication session establishment procedure, whether the UE supports RACS optimization for the RAT; and transmitting, during signaling of the communication session establishment procedure, a communication session establishment message including a UE radio capability identifier corresponding to the RAT based at least in part on a result of determining whether the UE supports RACS optimization for the RAT.

In some aspects, a method of wireless communication, performed by a BS, may include initiating a communication session establishment procedure to enable a UE to connect using a RAT; receiving, during signaling of the communication session establishment procedure, a communication session establishment message including a UE radio capability identifier that applies to the RAT from the UE; and determining, based at least in part on a result of receiving the communication session establishment message including the UE radio capability identifier, a network capability of the UE.

In some aspects, a BS for wireless communication may include memory and one or more processors operatively coupled to the memory. The memory and the one or more processors may be configured to initiate a communication session establishment procedure to enable a UE to connect using a RAT; receive, during signaling of the communication session establishment procedure, a communication session establishment message including a UE radio capability identifier that applies to the RAT from the UE; and determine, based at least in part on a result of receiving the communication session establishment message including the UE radio capability identifier, a network capability of the UE.

In some aspects, a non-transitory computer-readable medium may store one or more instructions for wireless communication. The one or more instructions, when executed by one or more processors of a BS, may cause the one or more processors to initiate a communication session establishment procedure to connect using a RAT; determine, in connection with the communication session establishment procedure, whether the UE supports RACS optimization for the RAT; and transmit, during signaling of the communication session establishment procedure, a communication session establishment message including a UE radio capability identifier corresponding to the RAT based at least in part on a result of determining whether the UE supports RACS optimization for the RAT.

In some aspects, a non-transitory computer-readable medium may store one or more instructions for wireless communication. The one or more instructions, when executed by one or more processors of a BS, may cause the one or more processors to initiate a communication session establishment procedure to enable a narrowband UE to connect using a RAT; receive, during signaling of the communication session establishment procedure, a communication session establishment message including a UE radio capability identifier that applies to the RAT from the UE; and determine, based at least in part on a result of receiving the communication session establishment message including the UE radio capability identifier, a network capability of the UE.

In some aspects, an apparatus for wireless communication may include means for initiating a communication session establishment procedure to connect using a RAT; means for determining, in connection with the communication session establishment procedure, whether the UE supports RACS optimization for the RAT; and means for transmitting, during signaling of the communication session establishment procedure, a communication session establishment message including a UE radio capability identifier corresponding to the RAT based at least in part on a result of determining whether the UE supports RACS optimization for the RAT.

In some aspects, an apparatus for wireless communication may include means for initiating a communication session establishment procedure to enable a UE to connect using a RAT; means for receiving, during signaling of the communication session establishment procedure, a communication session establishment message including a UE radio capability identifier that applies to the RAT from the UE; and means for determining, based at least in part on a result of receiving the communication session establishment message including the UE radio capability identifier, a network capability of the UE.

Aspects generally include a method, apparatus, system, computer program product, non-transitory computer-readable medium, user equipment, base station, wireless communication device, and/or processing system as substantially described with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

DETAILED DESCRIPTION

Figure 1:
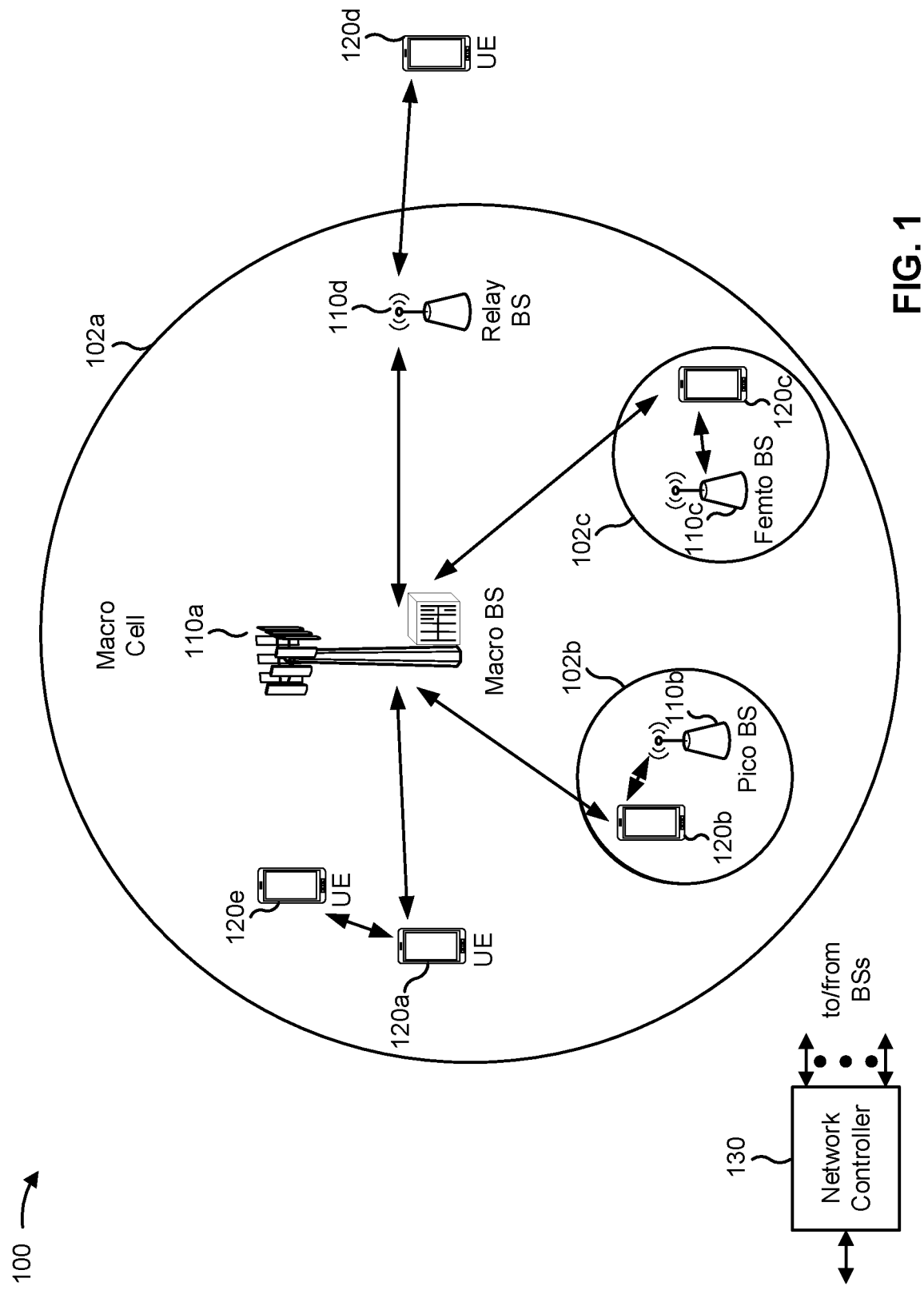
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It should be noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a wireless network 100 in which aspects of the present disclosure may be practiced. The wireless network 100 may be an LTE network or some other wireless network, such as a 5G network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered narrowband (NB) UEs. For example, an NB UE may be able to connect to a BS using an NB RAT, an NB RAT and a non-NB RAT, and/or the like. Some NB UEs may be configured for radio capability signaling (RACS) optimization. For example, an NB UE may store a first UE radio capability identifier for use for NB RATs (e.g., an NB-IoT RAT), a second UE radio capability identifier for non-NB RATs (e.g., a WB-E-UTRA RAT, an NR RAT, and/or the like), and/or the like.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices, as described above. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples may differ from what is described with regard to FIG. 1.

Figure 2:
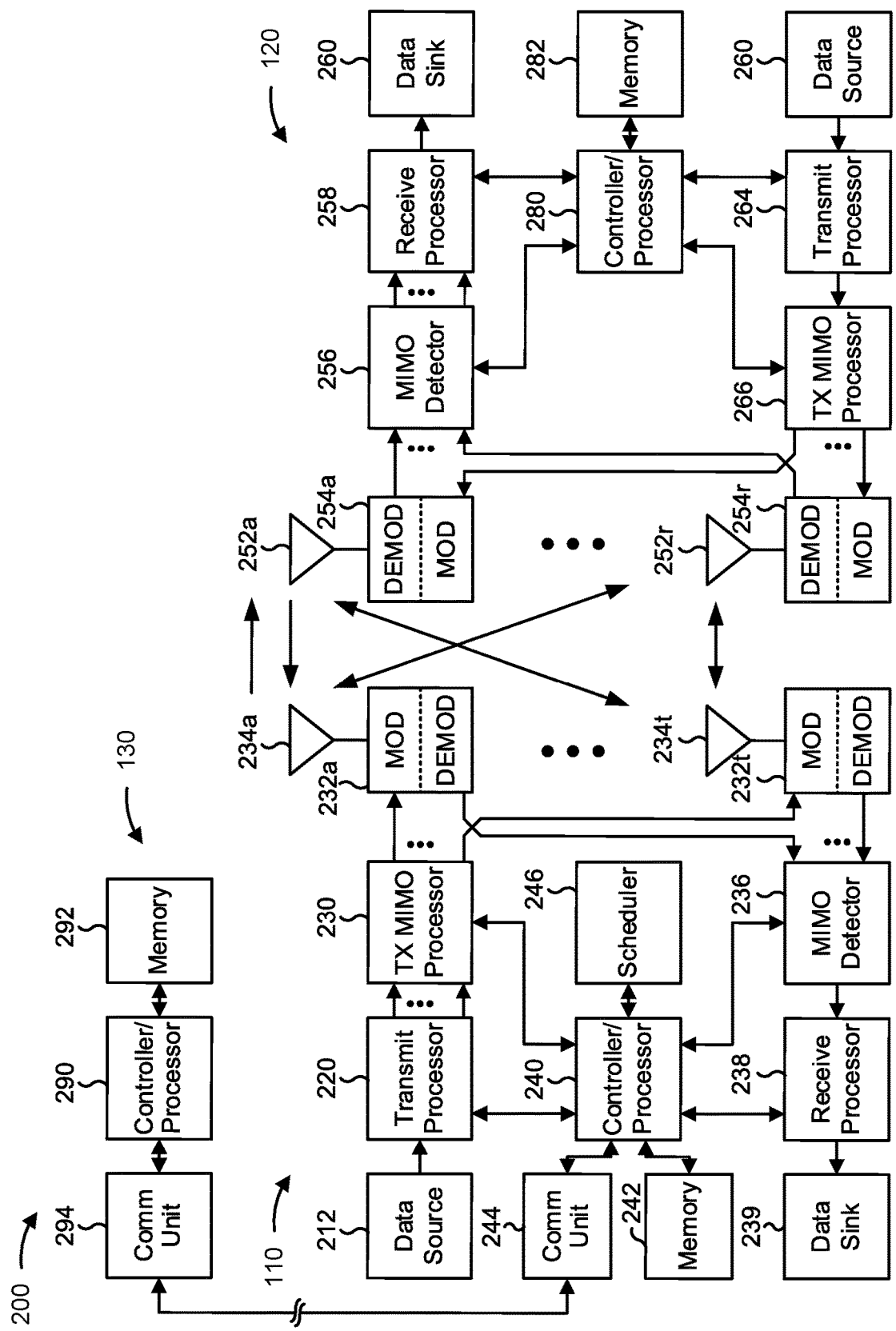
FIG. 2 is a diagram illustrating an example of a base station in communication with a UE in a wireless communication network.

FIG. 2 shows a block diagram 200 of a design of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, may select a modulation and coding scheme (MCS) for each UE based at least in part on channel quality indicators (CQIs) received from the UE, process (e.g., encode and modulate) the data for each UE based at least in part on the MCS selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the CRS) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 120, a transmit processor 264 may receive and process data from a data source 262 and control information (e.g., for reports comprising RSRP, RSSI, RSRQ, CQI, UE capability identifiers, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with radio access technology capability signaling, as described in more detail elsewhere herein. For example, controller/processor 240 of base station 110, controller/processor 280 of UE 120, and/or any other component(s) of FIG. 2 may perform or direct operations of, for example, method 400 of FIG. 4, method 700 of FIG. 7, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples may differ from what is described with regard to FIG. 2.

"5G" may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, 5G may utilize OFDM with a CP (herein referred to as cyclic prefix OFDM or CP-OFDM) and/or SC-FDM on the uplink, may utilize CP-OFDM on the downlink and include support for half-duplex operation using TDD. In aspects, 5G may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. 5G may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

A single component carrier bandwidth of 100 MHz may be supported. 5G resource blocks may span 12 sub-carriers with a sub-carrier bandwidth of 75 kilohertz (kHz) over a 0.1 ms duration. Each radio frame may include 50 subframes with a length of 10 ms. Consequently, each subframe may have a length of 0.2 ms. Each subframe may indicate a link direction (e.g., DL or UL) for data transmission and the link direction for each subframe may be dynamically switched. Each subframe may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, 5G may support a different air interface, other than an OFDM-based interface. 5G networks may include entities such central units or distributed units.

The RAN may include a central unit (CU) and distributed units (DUs). A 5G BS (e.g., gNB, 5G Node B, Node B, transmit receive point (TRP), access point (AP)) may correspond to one or multiple BSs. 5G cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some aspects, DCells may not transmit synchronization signals. In some aspects, DCells may transmit synchronization signals. 5G BSs may transmit downlink signals to UEs indicating the cell type. Based at least in part on the cell type indication, the UE may communicate with the 5G BS. For example, the UE may determine 5G BSs to consider for cell selection, access, handover, and/or measurement based at least in part on the indicated cell type.

Figure 3:
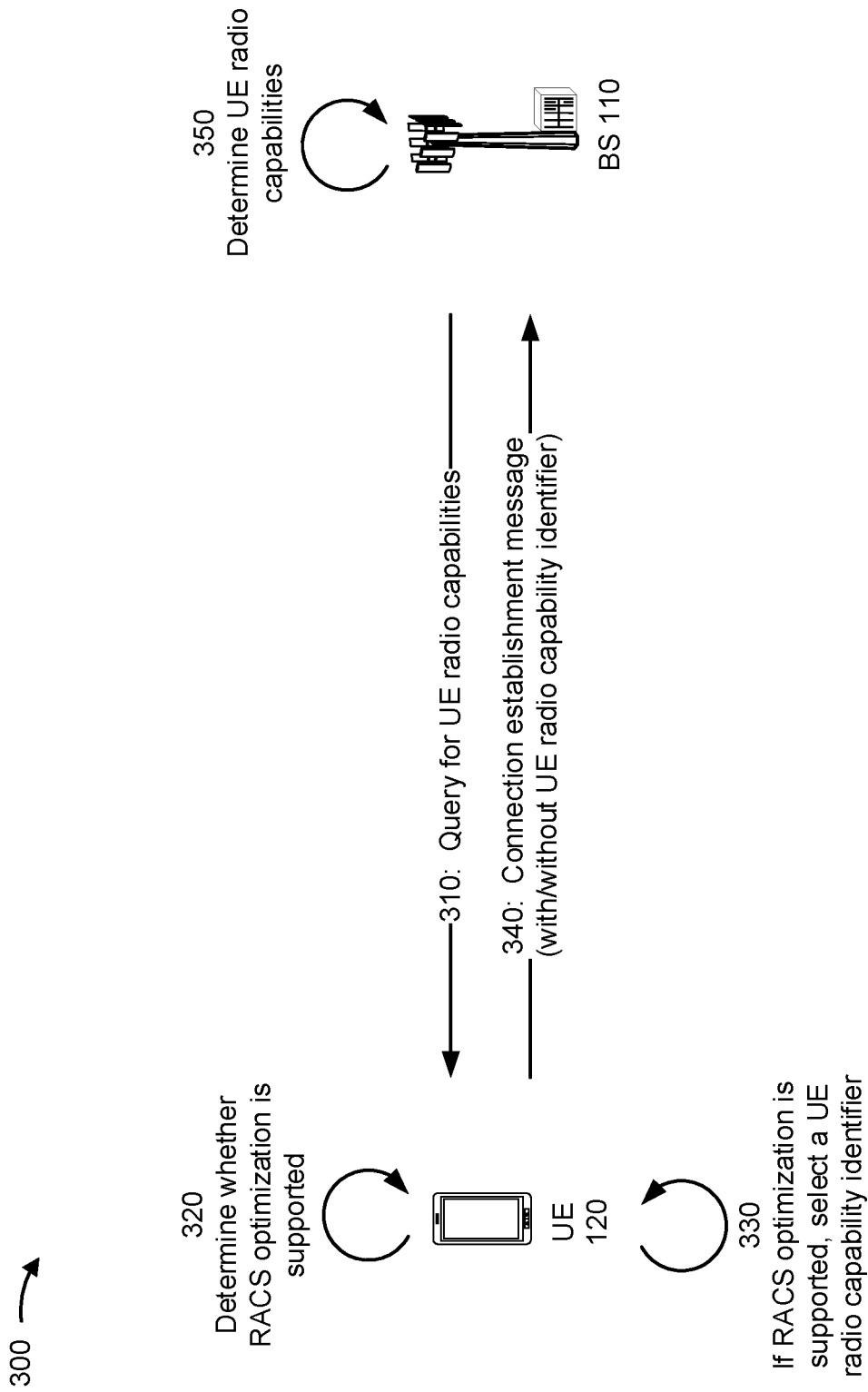
FIG. 3 is a diagram illustrating an example of radio access technology capability signaling.

FIG. 3 is a diagram illustrating an example 300 of radio access technology capability signaling. As shown in FIG. 3, example 300 may include a BS 110 and a UE 120. BS 110 and UE 120 may initiate a connection establishment procedure. For example, UE 120 may initiate an attach procedure, a tracking area update (TAU) procedure, a registration procedure, and/or the like. In some aspects, UE 120 may determine to camp onto BS 110, to transfer from another BS 110 to BS 110, and/or the like.

At 310, based at least in part on an initiation of a connection establishment procedure, in some aspects, BS 110 may query UE 120 for UE radio capabilities. For example, BS 110 may request that UE 120 provide information identifying whether UE 120 is capable of connecting to an NB RAT (e.g., a RAT for NB-IoT UEs), a non-NB RAT (e.g., a WB-E-UTRA RAT, an NR RAT, and/or the like), and/or the like.

At 320, UE 120 may determine whether RACS optimization is supported. For example, UE 120 may determine that UE 120 supports RACS optimization for the radio access technology (RAT), and may determine to transmit a message identifying the RACS optimization support. In contrast, UE 120 may determine that UE 120 does not support RACS optimization for the RAT (e.g., UE 120 does not support RACS optimization or UE 120 supports RACS optimization but for another RAT or set of radio access technologies), and may determine not to transmit a message identifying the RACS optimization support.

In some aspects, UE 120 may determine to provide a UE radio capability identifier to identify the UE radio capabilities based at least in part on determining that RACS optimization is supported. For example, based at least in part on receiving a query for radio capabilities from a BS 110 providing a WB-E-EUTRA RAT or an NR RAT, UE 120 may be triggered to provide a UE radio capability identifier identifying UE radio capabilities for each non-NB RAT. In this case, UE 120 may store an access and mobility management function (AMF) or mobility management entity (MME) assigned UE radio capability identifier that is for non-NB RATs that UE 120 may include in a connection establishment message. In some aspects, UE 120 may determine to provide a UE radio capability identifier with a particular format. For example, UE 120 may provide a radio capability indicator encoded using abstract syntax notation one (ASN.1) or other types of encoding. In some aspects, UE 120 may determine to provide a UE radio capability identifier using a particular indicator format. For example, UE 120 may provide the UE radio capability identifier in a form of one or more bits, a bit map, a numeric value, and/or the like.

Additionally, or alternatively, based at least in part on receiving a query for radio capabilities from a BS 110 providing an NB-IoT RAT, UE 120 may provide a UE radio capability identifier identifying UE radio capabilities for NB-IoT RATs and not for other RATs. In this case, UE 120 may store an AMF or MME assigned UE radio capability identifier that is for NB RATs that UE 120 may include in a connection establishment message. Additionally, or alternatively, based at least in part on not supporting RACs, UE 120 may determine to not signal a UE radio capability identifier in a connection establishment message. In this case, BS 110 can determine that UE 120 does not support RACS optimization based at least in part on UE 120 not signaling the UE radio capability identifier, and may detect a UE radio capability and store information identifying the UE radio capability using an AMF or MME.

At 330, if RACS optimization is supported, UE 120 may select a UE radio capability identifier to provide to BS 110. For example, as described above, UE 120 may select a UE radio capability identifier, of one or more available UE radio capability identifiers, for an NB type of RAT. Additionally, or alternatively, UE 120 may select a UE radio capability identifier for a non-NB type of RAT, such as an NR UE radio capability identifier, a WB-E-UTRA radio capability identifier, and/or the like.

At 340, UE 120 may transmit a connection establishment message. For example, when UE 120 supports RACS optimization for the RAT, UE 120 may transmit a connection establishment message that includes a UE radio capability identifier. Additionally, or alternatively, when UE 120 does not support RACS optimization, UE 120 may transmit a connection establishment message that does not include the UE radio capability identifier. In some aspects, UE 120 may convey the UE radio capability identifier using a non-access stratum (NAS) message. For example, UE 120 may transmit an NAS message indicating support for RACS optimization for WB-E-UTRA and NR; support for RACS optimization for WB-E-UTRA, NR, and NB-IoT; or no support for RACS optimization.

In another example, subsequently, when UE 120 transfers to another RAT to which the UE radio capability identifier does not apply, UE 120 may determine whether UE 120 supports RACS optimization for the other RAT. In this case, when UE 120 does support RACS optimization for the other RAT, UE 120 may transmit another message including another UE radio capability identifier that does apply to the other RAT.

At 350, BS 110 may determine UE radio capabilities. For example, BS 110 may determine that UE 120 supports RACS optimization for the RAT or does not support RACS optimization. In this case, BS 110 may determine that UE 120 supports RACS optimization for the RAT based at least in part on receiving a UE radio capability identifier that indicates UE 120 support for RACS optimization. Based at least in part on not receiving a UE radio capability identifier in connection with a connection establishment message, BS 110 may determine that UE 120 does not support RACS optimization.

As indicated above, FIG. 3 is provided as an example. Other examples may differ from what is described with respect to FIG. 3.

Figure 4:
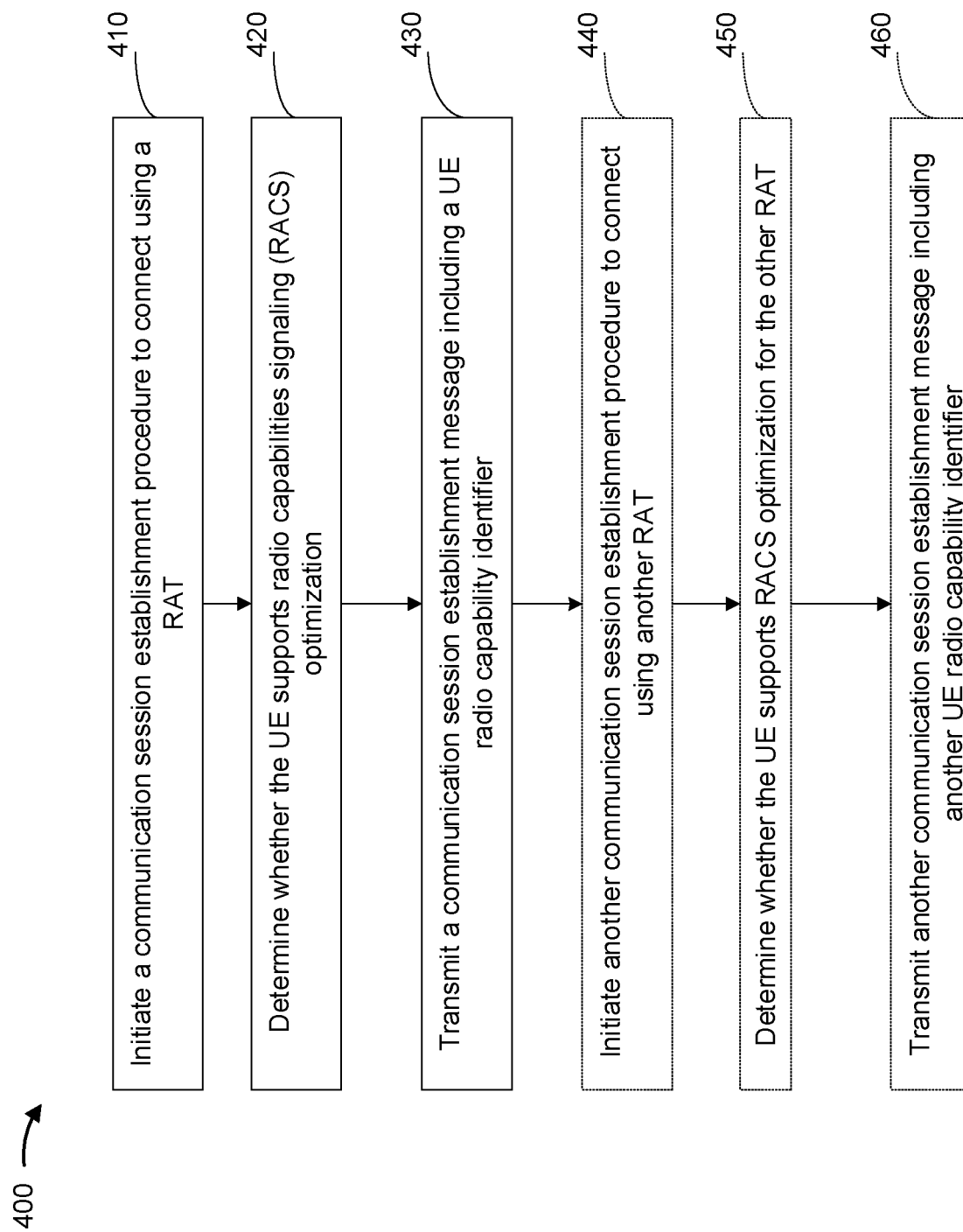
FIG. 4 is a flowchart of a method of wireless communication.

FIG. 4 is a flow chart of a method 400 of wireless communication. The method 400 may be performed by a UE (e.g., UE 120, apparatus 502/502', UE 850, and/or the like). In some aspects, the method 400 may be an example of using information regarding whether RACS optimization is supported to forgo transmitting some radio capability identifiers that do not correspond to a RAT to which a UE is to connect, thereby reducing network traffic.

At 410, the UE may initiate a communication session establishment procedure to connect using a RAT. For example, the UE (e.g., using receive processor 258, transmit processor 264, controller/processor 280, memory 282, and/or the like) may initiate a communication session establishment procedure to connect using a RAT, as described above in FIG. 3 and at 310. In some aspects, the UE supports a plurality of RATs.

At 420, the UE may determine whether the UE supports radio capability signaling (RACS) optimization. For example, the UE (e.g., using receive processor 258, transmit processor 264, controller/processor 280, memory 282, and/or the like) may determine, in connection with the communication session establishment procedure, whether the UE supports RACS optimization for the RAT, as described above in FIG. 3 and at 320.

At 430, the UE may transmit a communication session establishment message including a UE radio capability identifier. For example, the UE (e.g., using receive processor 258, transmit processor 264, controller/processor 280, memory 282, and/or the like) may transmit, during signaling of the communication session establishment procedure, a communication session establishment message including a UE radio capability identifier corresponding to the RAT based at least in part on a result of determining whether the UE supports RACS optimization for the RAT, as described above in FIG. 3 and at 330. In this case, UE 120 may forgo transmitting UE radio capability identifiers relating to RATs other than a RAT to which UE is to establish a connection, thereby reducing network traffic.

At 440, in some aspects, the UE may initiate another communication session establishment procedure to connect using another RAT. For example, the UE (e.g., using receive processor 258, transmit processor 264, controller/processor 280, memory 282, and/or the like) may initiate another communication session establishment procedure to connect to another RAT for which the UE radio capability identifier does not apply, as described above in FIG. 3 and at 340.

At 450, in some aspects, the UE may determine whether the UE supports RACS optimization for the other RAT. For example, the UE (e.g., using receive processor 258, transmit processor 264, controller/processor 280, memory 282, and/or the like) may determine whether the UE supports RACS optimization for the other RAT, as described above in FIG. 3 and at 350.

At 460, the UE may transmit another communication session establishment message including another UE radio capability identifier. For example, the UE (e.g., using receive processor 258, transmit processor 264, controller/processor 280, memory 282, and/or the like) may transmit, during signaling of the other communication session establishment procedure, another communication session establishment message including another UE radio capability identifier that applies to the other RAT based at least in part on a result of determining whether the UE supports RACS optimization for the other RAT, as described above. In this case, when a RAT to which the UE is to connect is different from a RAT to which the UE has connected, the UE may transmit another UE radio capability identifier. In contrast, if the RAT to which the UE is to connect is the same as the RAT to which the UE has connected, the UE may forgo transmitting a radio capability identifier in accordance with RACS optimization procedures. In some aspects, the UE radio capability identifier is a narrowband Internet of Things radio capability identifier and the other UE radio capability identifier is a New Radio UE radio capability identifier.

Method 400 may include additional aspects, such as any single aspect or any combination of aspects described below and/or in connection with one or more other processes described elsewhere herein.

In a first aspect, the UE radio capability identifier indicates that the UE supports RACS optimization for the RAT. In a second aspect, alone or in combination with the first aspect, the UE radio capability identifier indicates that the UE supports a non-NB radio access technology (RAT), an NB RAT, or a combination thereof. In a third aspect, alone or in combination with one or more of the first and second aspects, the UE is configured to provide at least one of a first UE radio capability identifier for an NB RAT or a second UE radio capability identifier for a non-NB RAT as the UE radio capability identifier.

In a fourth aspect, alone or in combination with one or more of the first through third aspects, the UE is configured to provide the first UE radio capability identifier as a particular response to a query for a RAT capability of the UE when the RAT is the NB RAT. In a fifth aspect, alone or in combination with one or more of the first through fourth aspects, the UE is configured to provide the second UE radio capability identifier as a particular response to a query for a RAT capability of the UE when the RAT is the non-NB RAT. In a sixth aspect, alone or in combination with one or more of the first through fifth aspects, the UE does not support RACS optimization. In some aspects, the UE is configured not to transmit the UE radio capability identifier as a particular response to a query for a RAT capability of the UE. In a seventh aspect, alone or in combination with one or more of the first through sixth aspects, narrowband access, non-narrowband access, which may include wideband access, or a combination thereof.

Although FIG. 4 shows example blocks of a method of wireless communication, in some aspects, the method may include additional blocks, fewer blocks, different blocks, or differently arranged blocks than those shown in FIG. 4. Additionally, or alternatively, two or more blocks shown in FIG. 4 may be performed in parallel.

Figure 5:
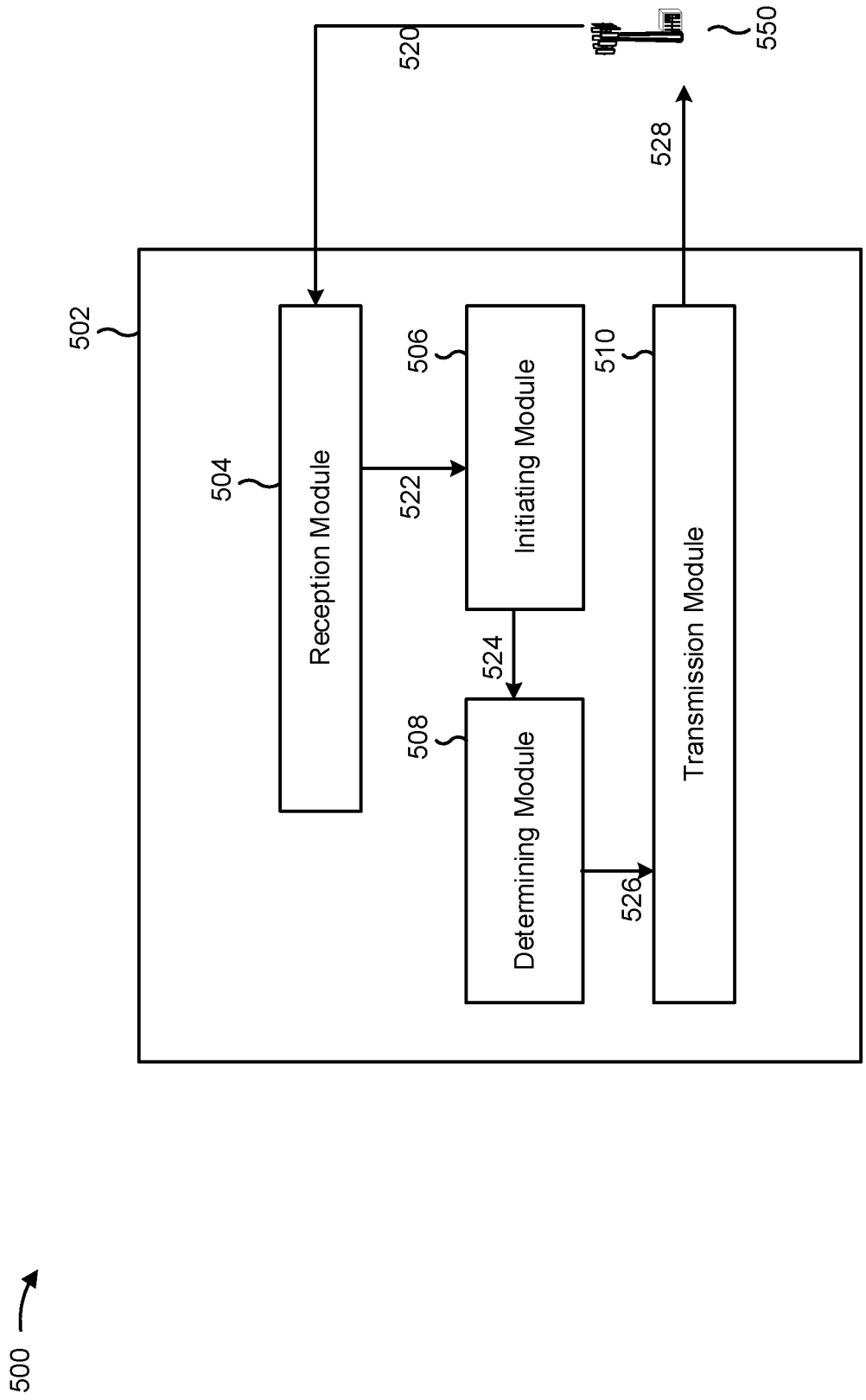
FIG. 5 is a conceptual data flow diagram illustrating a data flow between different modules/means/components in an example apparatus.

FIG. 5 is a conceptual data flow diagram 500 illustrating a data flow between different modules/means/components in an example apparatus 502. The apparatus 502 may be a UE. In some aspects, the apparatus 502 includes a reception module 504, an initiating module 506, a determining module 508, and/or a transmission module 510.

The reception module 504 may receive, from BS 550 and as data 520, information associated with initiating a connection establishment procedure. For example, the apparatus 502 may exchange one or more messages with the BS 550 associated with the apparatus 502 detecting the BS 550 and determining to attempt to establish a connection to the BS 550. In this case, the one or more messages may include an attach message, a TAU message, a registration message, and/or the like.

The initiating module 506 may receive, from reception module 504 and as data 522, information associated with initiating the establishment procedure. For example, the initiating module 506 may receive data indicating that the BS 550 is available for a connection, and may trigger the apparatus 502 to connect to the BS 550 using an available RAT provided by the BS 550.

The determining module 508 may receive, from initiating module 506 and as data 524, information associated with determining whether the apparatus 502 supports RACS optimization for the RAT. For example, the determining module 508 may receive information identifying a stored UE radio capability identifier, a plurality of stored UE capability identifiers, and/or the like, which may indicate that the apparatus 502 supports RACS optimization for the RAT. In this case, the determining module 508 may determine to transmit information identifying a UE radio capability identifier, which corresponds to information identifying UE capabilities of the apparatus 502, rather than information explicitly identifying the UE capabilities, thereby reducing signaling overhead. Alternatively, the determining module 508 may determine that the apparatus 502 does not support RACS optimization, and may determine not to transmit the UE radio capability identifier.

The transmission module 510 may receive, from determining module 508 and as data 526, information associated with transmitting a connection establishment message, as data 528, to BS 550. For example, the transmission module 510 may receive information identifying a UE radio capability identifier to include in the connection establishment message, an instruction not to include a UE radio capability identifier in a connection establishment message, and/or the like.

Figure 7:
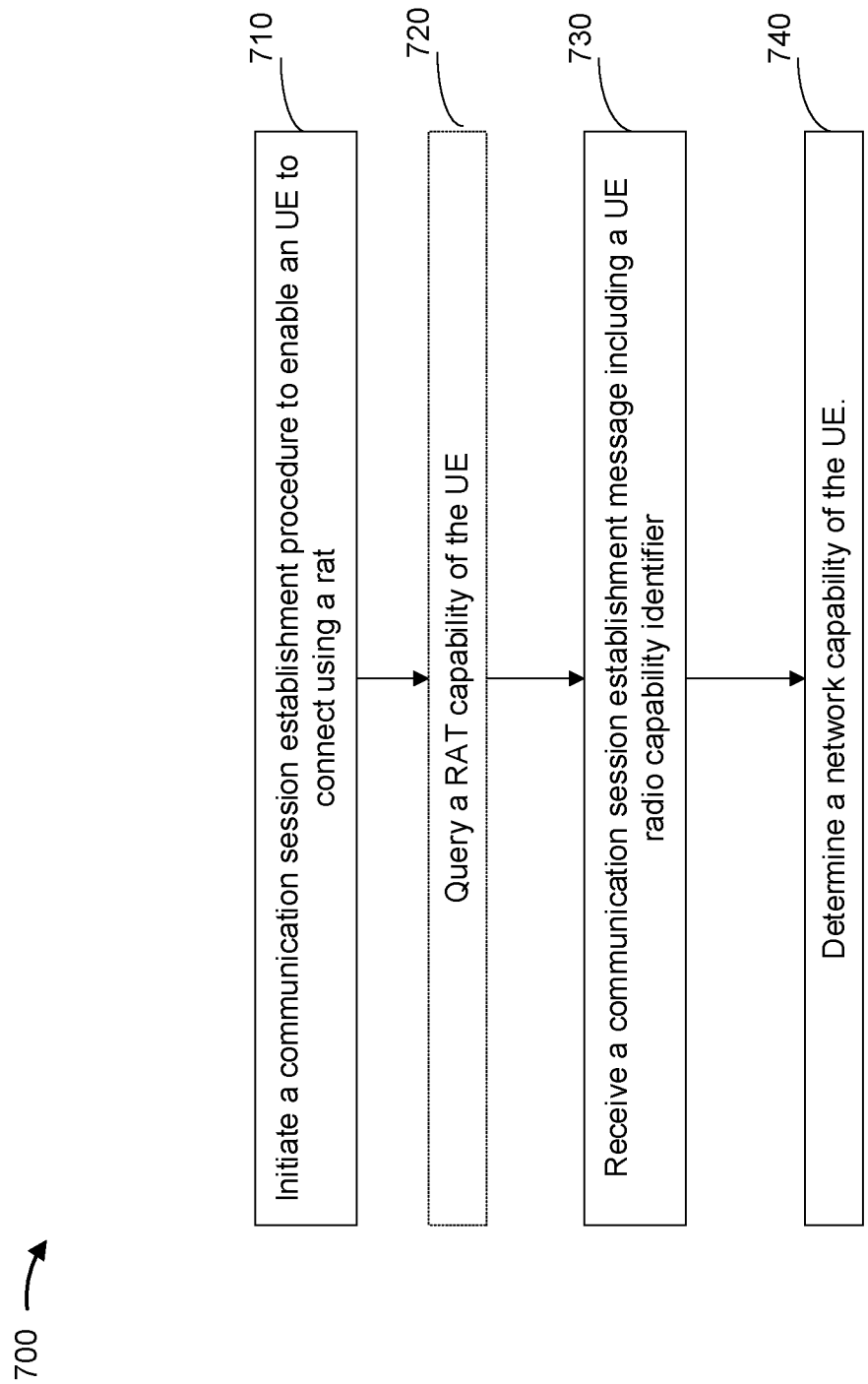
FIG. 7 is a flowchart of a method of wireless communication.

The apparatus may include additional modules that perform each of the blocks of the algorithm in the aforementioned method 400 of FIG. 4, method 700 of FIG. 7, and/or the like. Each block in the aforementioned method 400 of FIG. 4, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 5 are provided as an example. In practice, there may be additional modules, fewer modules, different modules, or differently arranged modules than those shown in FIG. 5. Furthermore, two or more modules shown in FIG. 5 may be implemented within a single module, or a single module shown in FIG. 5 may be implemented as multiple, distributed modules. Additionally, or alternatively, a set of modules (e.g., one or more modules) shown in FIG. 5 may perform one or more functions described as being performed by another set of modules shown in FIG. 5.

Figure 6:
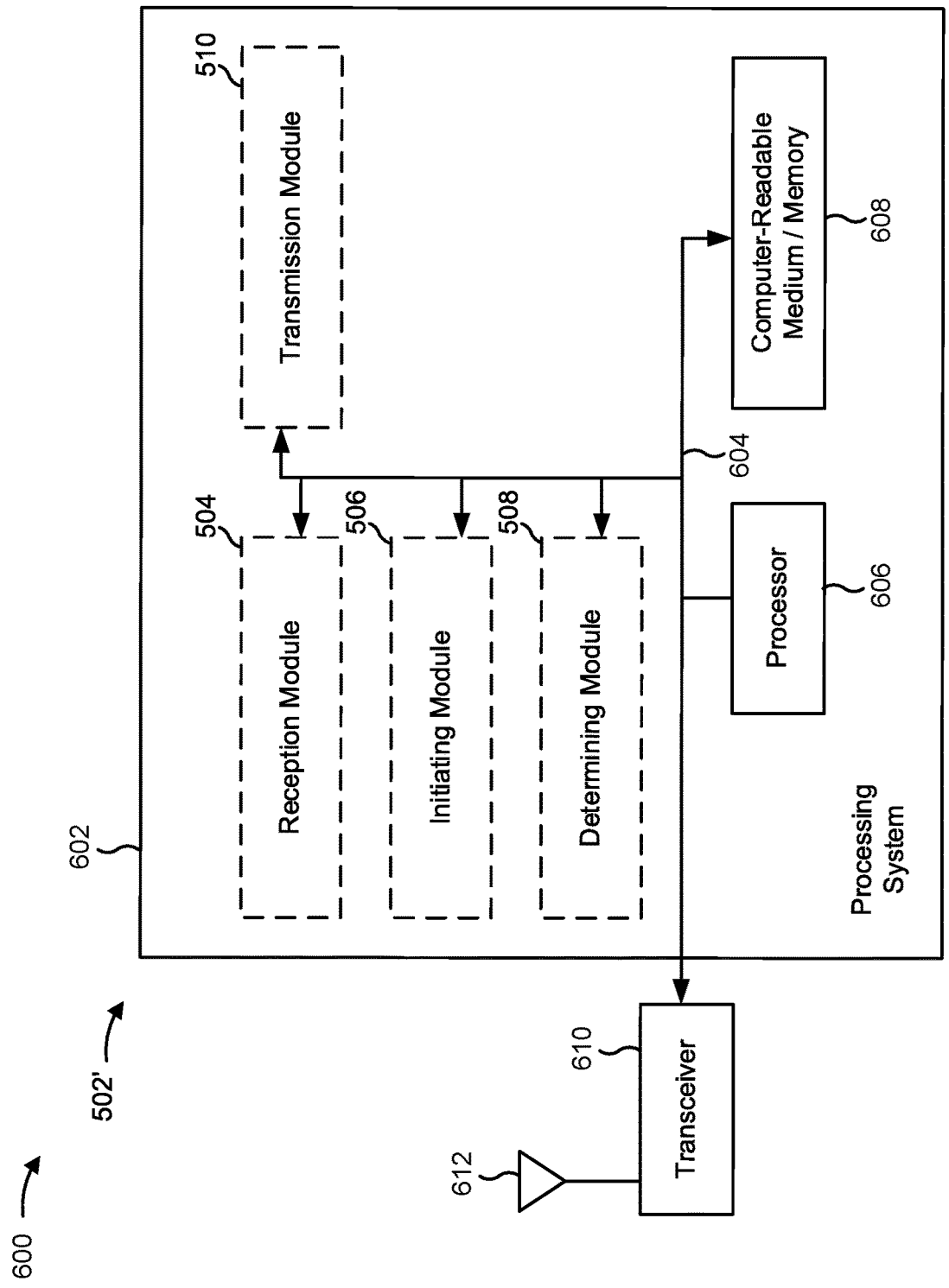
FIG. 6 is a diagram illustrating an example of a hardware implementation for an apparatus employing a processing system.

FIG. 6 is a diagram 600 illustrating an example of a hardware implementation for an apparatus 502' employing a processing system 602. The apparatus 502' may be UE.

The processing system 602 may be implemented with a bus architecture, represented generally by the bus 604. The bus 604 may include any number of interconnecting buses and bridges depending on the specific application of the processing system 602 and the overall design constraints. The bus 604 links together various circuits including one or more processors and/or hardware modules, represented by the processor 606, the modules 504, 506, 508, 510, and the computer-readable medium/memory 608. The bus 604 may also link various other circuits such as timing sources, peripherals, voltage regulators, and power management circuits, which are well known in the art, and therefore will not be described any further.

The processing system 602 may be coupled to a transceiver 610. The transceiver 610 is coupled to one or more antennas 612. The transceiver 610 provides a means for communicating with various other apparatuses over a transmission medium. The transceiver 610 receives a signal from the one or more antennas 612, extracts information from the received signal, and provides the extracted information to the processing system 602, specifically the reception module 504. In addition, the transceiver 610 receives information from the processing system 602, specifically the transmission module 510, and based at least in part on the received information, generates a signal to be applied to the one or more antennas 612. The processing system 602 includes a processor 606 coupled to a computer-readable medium/memory 608. The processor 606 is responsible for general processing, including the execution of software stored on the computer-readable medium/memory 608. The software, when executed by the processor 606, causes the processing system 602 to perform the various functions described herein for any particular apparatus. The computer-readable medium/memory 608 may also be used for storing data that is manipulated by the processor 606 when executing software. The processing system further includes at least one of the modules 504, 506, 508, and 510. The modules may be software modules running in the processor 606, resident/ stored in the computer readable medium/memory 608, one or more hardware modules coupled to the processor 606, or some combination thereof. The processing system 602 may be a component of the UE 120 and may include the memory 282 and/or at least one of the TX MIMO processor 266, the RX processor 258, and/or the controller/processor 280.

In some aspects, the apparatus 502/502' for wireless communication includes means for initiating a communication session establishment procedure to connect using a RAT; means for determining, in connection with the communication session establishment procedure, whether the UE supports RACS optimization; and means for transmitting, during signaling of the communication session establishment procedure, a communication session establishment message including a UE radio capability identifier corresponding to the RAT based at least in part on a result of determining whether the UE supports RACS optimization for the RAT. The aforementioned means may be one or more of the aforementioned modules of the apparatus 502 and/or the processing system 602 of the apparatus 502' configured to perform the functions recited by the aforementioned means. As described elsewhere herein, the processing system 602 may include the TX MIMO processor 266, the RX processor 258, and/or the controller/processor 280. In one configuration, the aforementioned means may be the TX MIMO processor 266, the RX processor 258, and/or the controller/processor 280 configured to perform the functions and/or operations recited herein.

FIG. 6 is provided as an example. Other examples may differ from what is described in connection with FIG. 6.

FIG. 7 is a flow chart of a method 700 of wireless communication. The method 700 may be performed by a BS (e.g., BS 110, BS 450, apparatus 802/802', and/or the like). In some aspects, the method 400 may be an example of using information regarding whether RACS optimization is supported to forgo transmitting some radio capability identifiers that do not correspond to a RAT to which a UE is to connect, thereby reducing network traffic.

At 710, the BS may initiate a communication session establishment procedure to enable a UE to connect using a RAT. For example, the BS (e.g., using transmit processor 220, receive processor 238, controller/processor 240, memory 242, and/or the like) may initiate a communication session establishment procedure to enable a UE to connect using a RAT, as described above in FIG. 3 and at 310.

At 720, in some aspects, the BS may query a RAT capability of the UE. For example, the BS (e.g., using transmit processor 220, receive processor 238, controller/ processor 240, memory 242, and/or the like) may query the RAT capability of the UE, as described above in FIG. 3 and at 320.

At 730, the BS may receive a communication session establishment message including a UE radio capability identifier. For example, the BS (e.g., using transmit processor 220, receive processor 238, controller/processor 240, memory 242, and/or the like) may receive, during signaling of the communication session establishment procedure, a communication session establishment message including a UE radio capability identifier that applies to the RAT from the UE, as described above in FIG. 3 and at 330.

At 740, the BS may determine a network capability of the UE. For example, the BS (e.g., using transmit processor 220, receive processor 238, controller/processor 240, memory 242, and/or the like) may determine, based at least in part on a result of receiving the communication session establishment message including the UE radio capability identifier, a network capability of the UE, as described above in FIG. 3 and at 340.

Method 700 may include additional aspects, such as any single aspect or any combination of aspects described below and/or in connection with one or more other processes described elsewhere herein.

In a first aspect, the UE radio capability identifier indicates that the UE supports RACS optimization for the RAT. In a second aspect, alone or in combination with the first aspect, the UE radio capability identifier indicates a set of radio access technologies supported by the UE. In a third aspect, alone or in combination with one or more of the first and second aspects, method 700 may include querying a RAT capability of the UE and receiving the UE radio capability identifier as a particular response to querying the RAT capability of the UE.

In a fourth aspect, alone or in combination with one or more of the first through third aspects, the UE radio capability identifier is at least one of a first UE radio capability identifier for an NB RAT or a second UE radio capability identifier for a non-NB RAT. In a fifth aspect, alone or in combination with one or more of the first through fourth aspects, the BS is configured to receive the first UE radio capability identifier as a particular response to a query for a RAT capability of the UE when the RAT is the NB RAT. In a sixth aspect, alone or in combination with one or more of the first through fifth aspects, the BS is configured to receive the second UE radio capability identifier as a particular response to a query for a RAT capability of the UE when the RAT is the non-NB RAT. In a seventh aspect, alone or in combination with one or more of the first through sixth aspects, the BS is configured to determine that the UE does not support a RACS optimization based at least in part on the UE forgoing transmission of a UE radio capability as a particular response to a query for a RAT capability of the UE.

Although FIG. 7 shows example blocks of a method of wireless communication, in some aspects, the method may include additional blocks, fewer blocks, different blocks, or differently arranged blocks than those shown in FIG. 7. Additionally, or alternatively, two or more blocks shown in FIG. 7 may be performed in parallel.

Figure 8:
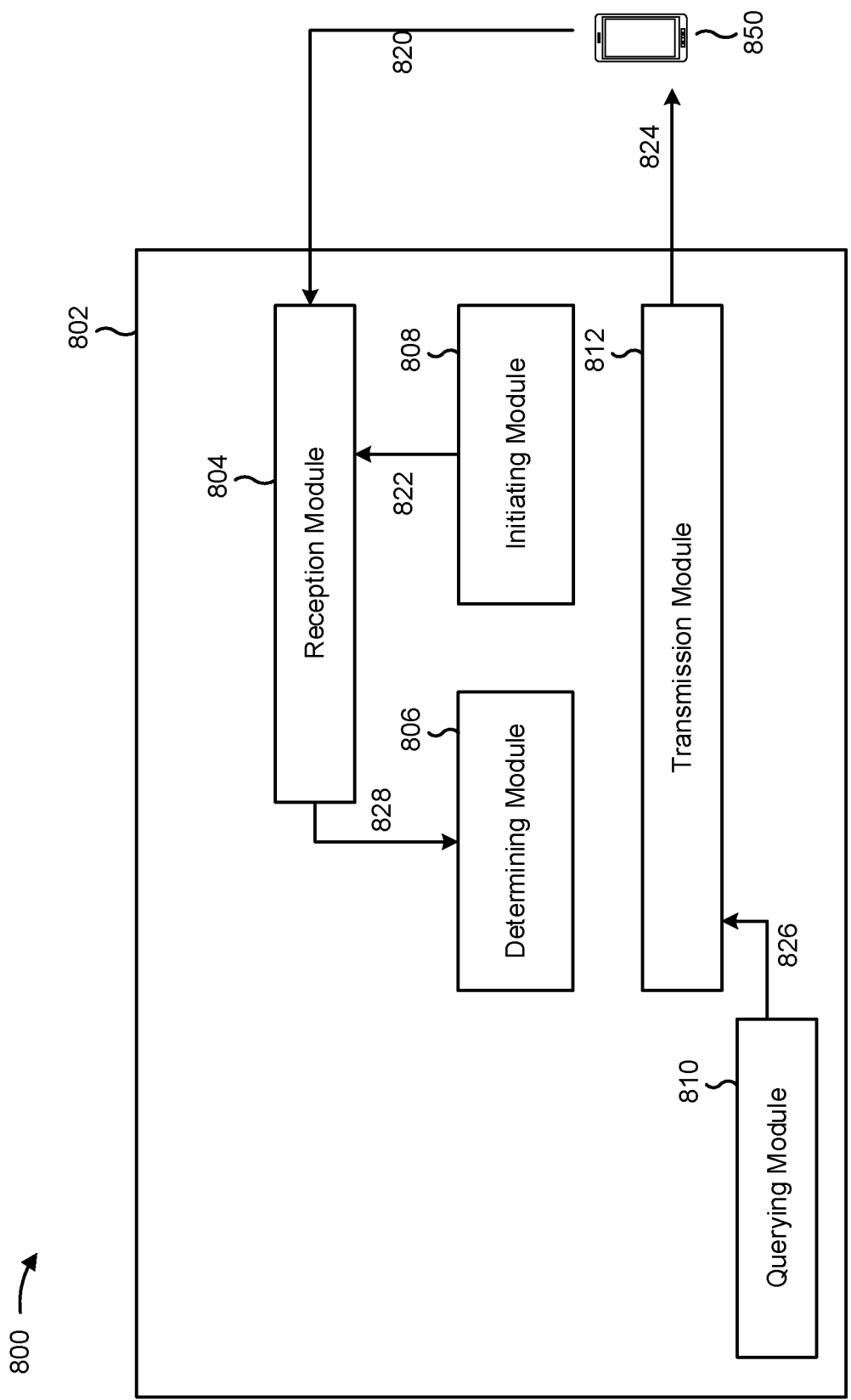
FIG. 8 is a conceptual data flow diagram illustrating a data flow between different modules/means/components in an example apparatus.

FIG. 8 is a conceptual data flow diagram 800 illustrating a data flow between different modules/means/components in an example apparatus 802. The apparatus 802 may be a BS. In some aspects, the apparatus 802 includes a reception module 804, a determining module 806, an initiating module 808, a querying module 810, and/or a transmission module 812.

The reception module 804 may receive, from user equipment 850 and as data 820 and/or from initiating module 808 as data 822, information associated with initiating a connection with user equipment 850. For example, the reception module 804 may receive an attach message, a TAU message, and/or the like to trigger establishment of a connection. Additionally, or alternatively, the reception module 804 may receive an instruction to monitor for messages from the user equipment 850 to initiate the connection establishment procedure. In some aspects, user equipment 850 may provide a connection establishment message to the reception module 804 based at least in part on receiving a query 824 from the transmission module 812, which may be triggered by the querying module 810 and data 826.

The determining module 806 may receive, from reception module 804 and as data 828, information associated with determining whether the user equipment 850 supports RACS optimization for the RAT. For example, the determining module 806 may receive a connection establishment message from the reception module 804, and may determine whether the user equipment 850 supports RACS optimization for the RAT based at least in part on whether a UE capability identifier is included in the connection establishment message. In this case, if a UE radio capability identifier is included in the connection establishment message, the determining module 806 may determine that the user equipment 850 supports RACS optimization for the RAT and may determine a set of RATs supported by the user equipment 850. Additionally, or alternatively, if the connection establishment message does not include a UE radio capability identifier, the determining module 806 may determine that the user equipment 850 does not support RACS optimization.

The apparatus may include additional modules that perform each of the blocks of the algorithm in the aforementioned method 400 of FIG. 4, method 700 of FIG. 7, and/or the like. Each block in the aforementioned method 400 of FIG. 4, method 700 of FIG. 7, and/or the like may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 8 are provided as an example. In practice, there may be additional modules, fewer modules, different modules, or differently arranged modules than those shown in FIG. 8. Furthermore, two or more modules shown in FIG. 8 may be implemented within a single module, or a single module shown in FIG. 8 may be implemented as multiple, distributed modules. Additionally, or alternatively, a set of modules (e.g., one or more modules) shown in FIG. 8 may perform one or more functions described as being performed by another set of modules shown in FIG. 8.

Figure 9:
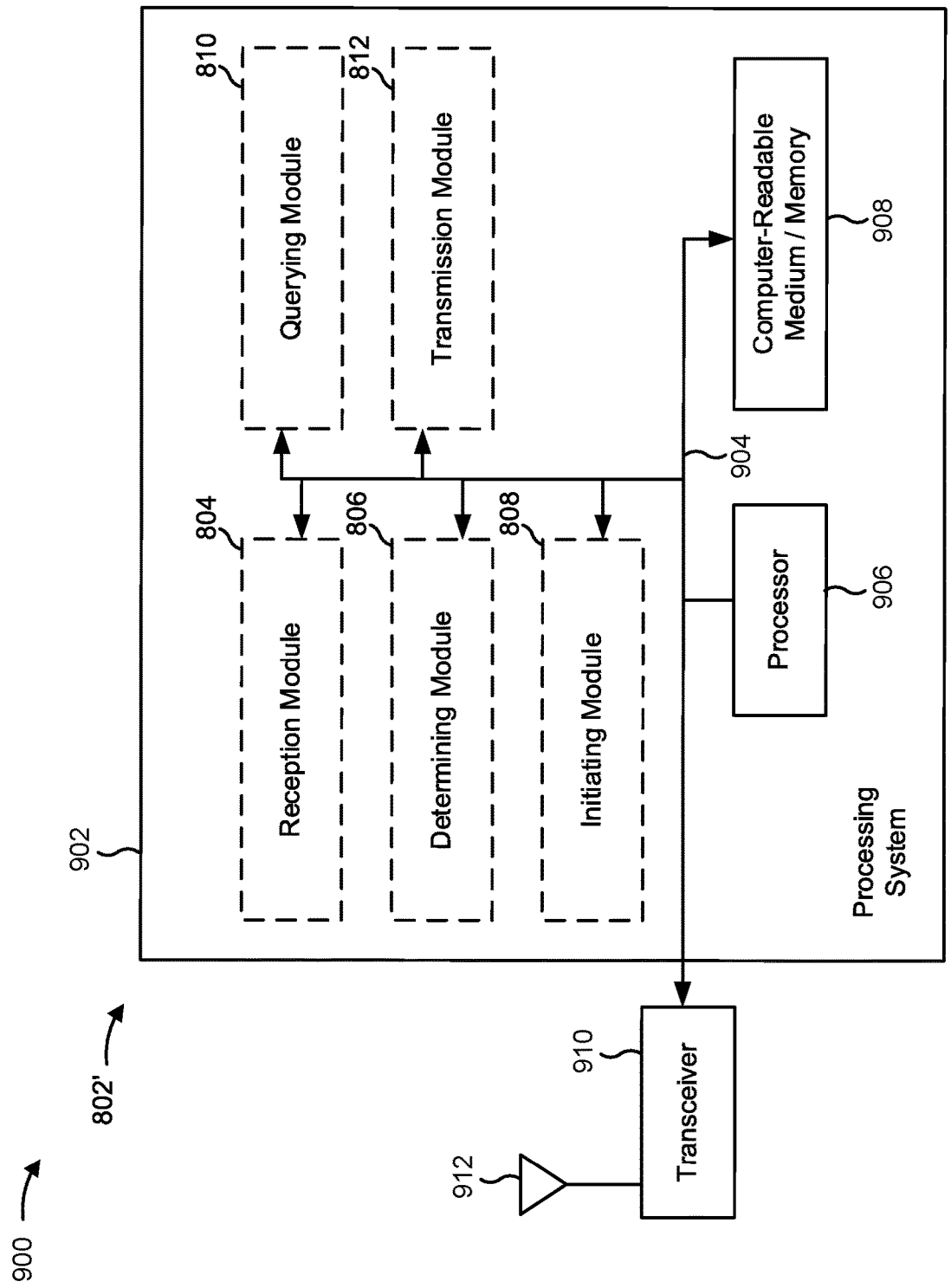
FIG. 9 is a diagram illustrating an example of a hardware implementation for an apparatus employing a processing system.

FIG. 9 is a diagram 900 illustrating an example of a hardware implementation for an apparatus 802' employing a processing system 902. The apparatus 802' may be a BS.

The processing system 902 may be implemented with a bus architecture, represented generally by the bus 904. The bus 904 may include any number of interconnecting buses and bridges depending on the specific application of the processing system 902 and the overall design constraints. The bus 904 links together various circuits including one or more processors and/or hardware modules, represented by the processor 906, the modules 804, 806, 808, 810, 812, and the computer-readable medium/memory 908. The bus 904 may also link various other circuits such as timing sources, peripherals, voltage regulators, and power management circuits, which are well known in the art, and therefore will not be described any further.

The processing system 902 may be coupled to a transceiver 910. The transceiver 910 is coupled to one or more antennas 912. The transceiver 910 provides a means for communicating with various other apparatuses over a transmission medium. The transceiver 910 receives a signal from the one or more antennas 912, extracts information from the received signal, and provides the extracted information to the processing system 902, specifically the reception module 804. In addition, the transceiver 910 receives information from the processing system 902, specifically the transmission module 812, and based at least in part on the received information, generates a signal to be applied to the one or more antennas 912. The processing system 902 includes a processor 906 coupled to a computer-readable medium/memory 908. The processor 906 is responsible for general processing, including the execution of software stored on the computer-readable medium/memory 908. The software, when executed by the processor 906, causes the processing system 902 to perform the various functions described herein for any particular apparatus. The computer-readable medium/memory 908 may also be used for storing data that is manipulated by the processor 906 when executing software. The processing system further includes at least one of the modules 804, 806, and 808. The modules may be software modules running in the processor 906, resident/stored in the computer readable medium/memory 908, one or more hardware modules coupled to the processor 906, or some combination thereof. The processing system 902 may be a component of the BS 110 and may include the memory 242 and/or at least one of the TX MIMO processor 230, the RX processor 238, and/or the controller/processor 240.

In some aspects, the apparatus 802/802' for wireless communication includes means for initiating a communication session establishment procedure to enable a narrowband (NB) UE to connect using a RAT; means for receiving, during signaling of the communication session establishment procedure, a communication session establishment message including a UE radio capability identifier that applies to the RAT from the UE; and means for determining, based at least in part on a result of receiving the communication session establishment message including the UE radio capability identifier, a network capability of the UE. The aforementioned means may be one or more of the aforementioned modules of the apparatus 802 and/or the processing system 902 of the apparatus 802' configured to perform the functions recited by the aforementioned means. As described elsewhere herein, the processing system 902 may include the TX MIMO processor 230, the receive processor 238, and/or the controller/processor 240. In one configuration, the aforementioned means may be the TX MIMO processor 230, the receive processor 238, and/or the controller/processor 240 configured to perform the functions and/or operations recited herein.

FIG. 9 is provided as an example. Other examples may differ from what is described in connection with FIG. 9.

Figure 10A:
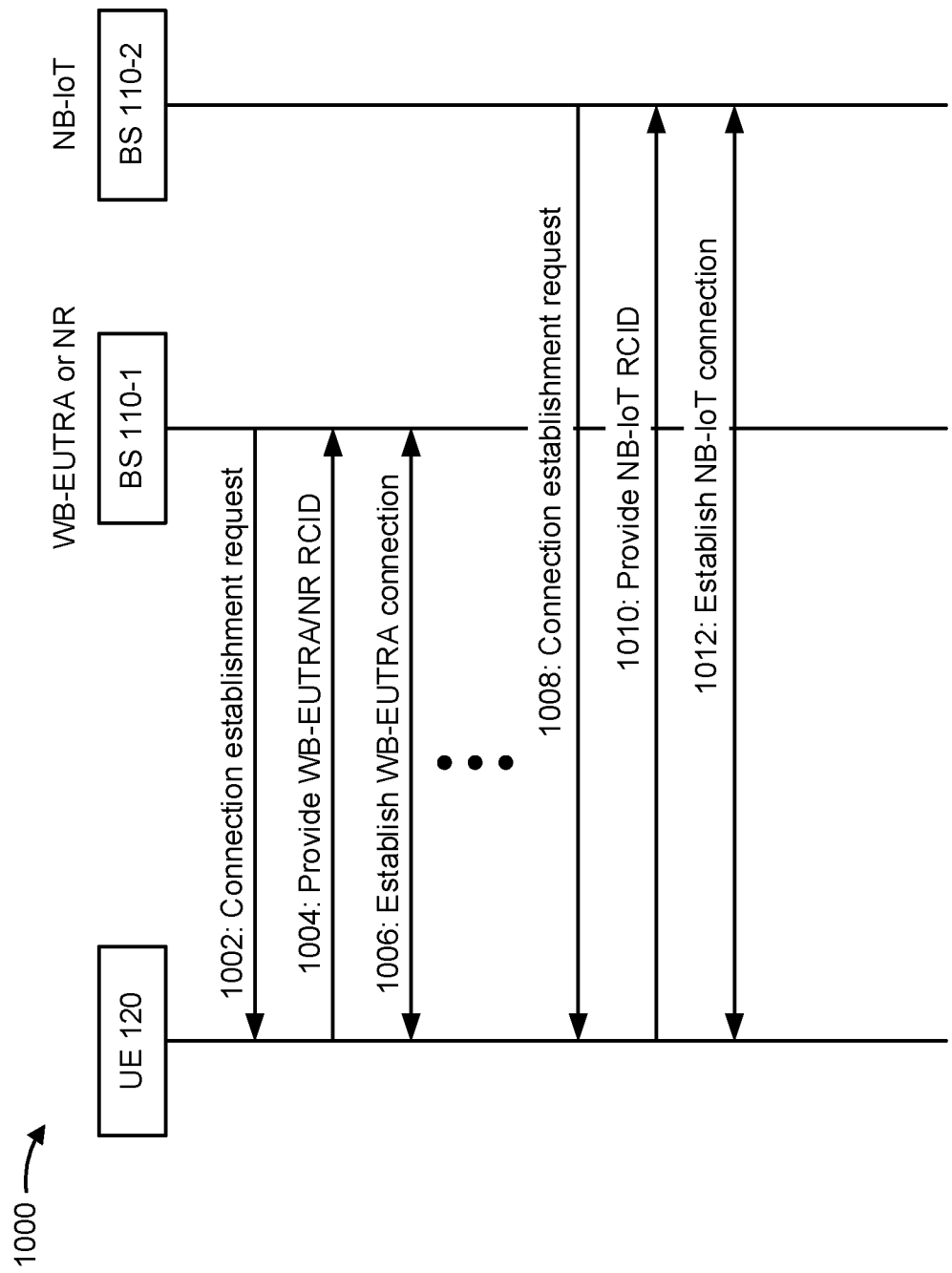
FIGS. 10A and 10B are diagrams illustrating an example of radio access technology capability signaling.
Figure 10B:
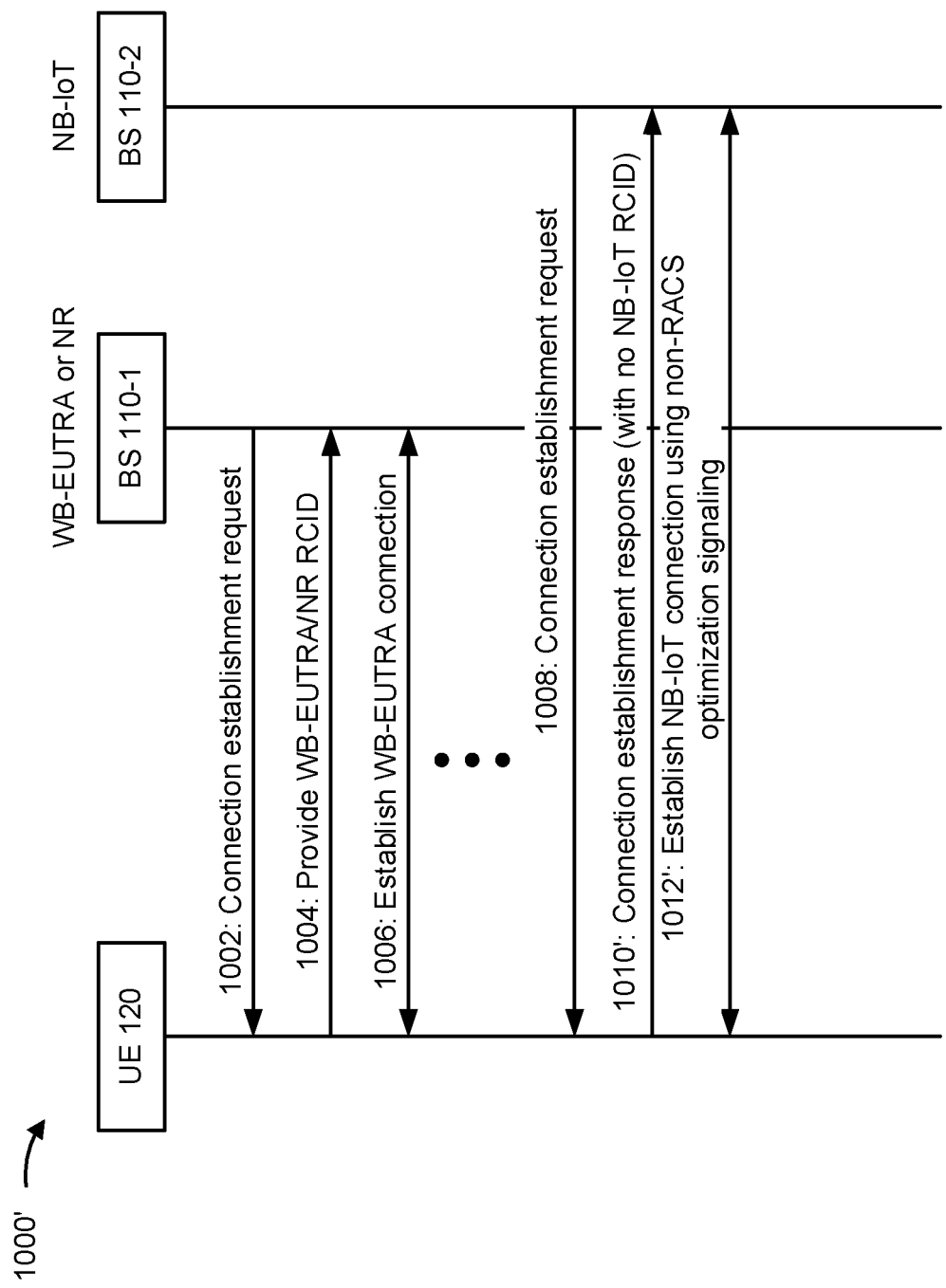

FIGS. 10A and 10B are diagrams illustrating examples 1000/1000' of RAT capability signaling. As shown in FIGS. 10A and 10B, examples 1000 may include BSs 110 (e.g., a first BS 110-1 providing a WB-EUTRA or NR RAT and a second BS 110-2 providing an NB-IoT RAT) and a UE 120.

As shown in FIG. 10A, and at 1002, UE 120 may receive a connection establishment request. For example, UE 120 may receive, from first BS 110-1, a message querying for radio capabilities of UE 120. In this case, UE 120 may determine a RAT provided by first BS 110-1 to determine which radio capability of UE 120 to identify to first BS 110-1. For example, when UE 120 supports RACS optimization for both NB-IoT and WB-EUTRA or NR, but first BS 110-1 is associated with providing a WB-EUTRA or NR RAT, UE 120 may determine to provide a radio capability identifier (RCID) for only the WB-EUTRA or NR RAT rather than providing an RCID for the NB-IoT RAT, thereby reducing signaling overhead.

At 1004 and 1006, UE 120 may provide an RCID for the WB-EUTRA or NR RAT and establish a connection with first BS 110-1. For example, UE 120 may provide an RCID that is for WB-EUTRA or NR, but not for NB-IoT. In some aspects, UE 120 may provide a plurality of RCIDs for WB-EUTRA or NR. For example, UE 120 may provide a plurality of RCIDs corresponding to a plurality of different WB-EUTRA or NR RATs.

At 1008, 1010, 1012, after a period of time, UE 120 may receive another connection establishment request. For example, UE 120 may receive a connection establishment request from second BS 110-2, which is associated with providing an NB-IoT RAT. In this case, UE 120 may provide an NB-IoT RAT RCID (and not an RCID that is for WB-EUTRA or NR RATs) and establish an NB-IoT connection with second BS 110-2.

In contrast, as shown in FIG. 10B, and at 1010' and 1012', when UE 120 does not support RACS optimization for NB-IoT, UE 120 may provide a connection establishment response (e.g., for an attach/TAU or a registration procedure) that does not include an NB-IoT RCID. For example, UE 120 may provide an empty field for bits that are to identify the RCID. Additionally, or alternatively, UE 120 may provide a particular value in the field that may indicate that an RCID is not provided in the field that is to include an RCID. In this case, second BS 110-2 may determine that UE 120 does not support RACS optimization for NB-IoT based at least in part on an absence of an RCID in the connection establishment response and may establish a connection with UE 120 using non-RACS optimization procedures. In this way, UE 120 and BSs 110 provide support for legacy non-RACS optimization operations in NB-IoT RATs.

As indicated above, FIGS. 10A and 10B are provided as examples. Other examples may differ from what is described with respect to FIGS. 10A and 10B.

It should be understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a user equipment (UE), comprising:
    initiating a communication session establishment procedure to connect using a non-narrowband (NB) radio access technology (RAT); of a plurality of RATs, including the non-NB RAT and an NB RAT, supported by the UE, wherein the non-NB RAT corresponds to a UE radio capability identifier identified during the communication session establishment procedure;

determining, during signaling of the communication session establishment procedure, whether the UE supports radio capability signaling (RACS) optimization for the non-NB RAT; and transmitting, during the signaling of the communication session establishment procedure, a communication session establishment message, wherein the communication session establishment message includes the UE radio capability identifier, or does not include the UE radio capability identifier, based at least in part on whether the UE supports RACS optimization for the non-NB RAT.

2. The method of claim 1, further comprising:
initiating another communication session establishment procedure to connect using a second RAT;
determining whether the UE supports RACS optimization for the second RAT; and
transmitting a second UE radio capability identifier that applies to the second RAT based on at least in part on determining whether the UE supports RACS optimization for the second RAT.

3. The method of claim 2, wherein the UE radio capability identifier is a narrowband radio capability identifier and the second UE radio capability identifier is a wideband UE radio capability identifier.

4. The method of claim 1, wherein the UE supports narrowband access and wideband access.

5. The method of claim 1, wherein the UE radio capability identifier indicates that the UE supports:
a plurality of non-NB RATs, associated with the UE, including the non-NB RAT,
a plurality of narrowband RATS, associated with the UE, including the NB RAT, or
a plurality of RATs, associated with the UE, including the non-NB RAT and the NB RAT.

6. The method of claim 1, further comprising:
providing at least one of the UE radio capability identifier for the non-NB RAT or a second UE radio capability identifier for the NB RAT as the UE radio capability identifier.

7. The method of claim 6, further comprising:
providing the UE radio capability identifier as a particular response to a query for a RAT capability of the UE.

8. The method of claim 1, further comprising:
determining that the UE does not support RACS optimization for the non-NB RAT; and
transmitting an empty field for the UE radio capability identifier as a particular response to a query for a RAT capability of the UE.

9. The method of claim 1, wherein the non-NB RAT is a wideband evolved universal mobile telecommunications system (UMTS) terrestrial radio access (WB-E-UTRA) RAT or a new radio (NR) RAT.

10. The method of claim 1, wherein the NB RAT is a NB internet-of-things (IoT) RAT.

11. The method of claim 1, wherein the non-NB RAT is associated with a first network node and the NB RAT is associated with a second network node.

12. A method of wireless communication performed by a network node, comprising:
initiating a communication session establishment procedure to enable a user equipment (UE), supporting a plurality of radio access technologies (RATs) including a narrowband (NB) RAT and a non-NB RAT, to connect using the non-NB RAT, wherein the non-NB RAT corresponds to a UE radio capability identifier identified during the communication session establishment procedure;
querying a RAT capability of the UE;
receiving, during signaling of the communication session establishment procedure and as a response to querying the RAT capability of the UE, a communication session establishment message,
wherein the communication session establishment message includes the UE radio capability identifier, or does not include the UE radio capability identifier, based at least in part on whether the UE supporting radio capability signaling (RACS) optimization for the non-NB RAT; and
determining, based at least in part on a result of receiving the communication session establishment message including the UE radio capability identifier, a network capability of the UE.

13. The method of claim 12, wherein the UE radio capability identifier indicates a set of RATs, supported by the UE, including the non-NB RAT.

14. The method of claim 12, further comprising:
receiving the UE radio capability identifier as a particular response to a query for a RAT capability of the UE.

15. The method of claim 12, wherein at least one of:
the non-NB RAT is a wideband evolved universal mobile telecommunications system (UMTS) terrestrial radio access (WB-E-UTRA) RAT or a new radio (NR) RAT,
the NB RAT is a NB internet-of-things (IoT) RAT, or
the non-NB RAT is associated with a first network node and the NB RAT is associated with a second network node.

16. A user equipment (UE) for wireless communication, comprising:
a memory; and
one or more processors coupled to the memory, the one or more processors configured to:
initiate a communication session establishment procedure to connect using a non-narrowband (NB) radio access technology (RAT), of a plurality of RATs, including the non-NB RAT and an NB RAT, supported by the UE, wherein the non-NB RAT corresponds to a UE radio capability identifier identified during the communication session establishment procedure;
determine, during the communication session establishment procedure, whether the UE supports radio capability signaling (RACS) optimization for the non-NB RAT; and
transmit, during signaling of the communication session establishment procedure, a communication session establishment message, wherein the communication session message includes the UE radio capability identifier, or does not include the UE radio capability identifier, based at least in part on whether the UE supports RACS optimization for the non-NB RAT.

17. The UE of claim 16, wherein the one or more processors are configured to:
initiate another communication session establishment procedure to connect using a second RAT;
determine whether the UE supports RACS optimization for the second RAT; and
transmit a second UE radio capability identifier that applies to the second RAT based at least in part on determining whether the UE supports RACS optimization for the second RAT.

18. The UE of claim 17, wherein the UE radio capability identifier is a narrowband Internet of Things radio capability identifier and the second UE radio capability identifier is a wideband UE radio capability identifier.

19. The UE of claim 16, wherein the UE supports narrowband access and wideband access.

20. The UE of claim 16, wherein the UE radio capability identifier indicates that the UE supports:
  a plurality of non-NB RATs, associated with the UE, including the non-NB RAT,
  a plurality of narrowband RATS, associated with the UE, including the NB RAT, or
  a plurality of RATs, associated with the UE, including the non-NB RAT and the NB RAT.

21. The UE of claim 16, UE is one or more processors are further configured to
  provide at least one of the UE radio capability identifier for the non-NB RAT or a second UE radio capability identifier for the NB RAT as the UE radio capability identifier.

22. The UE of claim 21, wherein the UE is configured to provide the UE radio capability identifier as a particular response to a query for a RAT capability of the UE.

23. The UE of claim 16, wherein the one or more processors are further configured to:
  determine that the UE does not support RACS optimization for the non-NB RAT; and
  transmitting an empty field for the UE radio capability identifier as a particular response to a query for a RAT capability of the UE.

24. The UE of claim 16, wherein the non-NB RAT is a wideband evolved universal mobile telecommunications system (UMTS) terrestrial radio access (WB-E-UTRA) RAT or a new radio (NR) RAT.

25. The UE of claim 16, wherein the NB RAT is a NB internet-of-things (IoT) RAT.

26. The UE of claim 16, wherein the non-NB RAT is associated with a first network node and the NB RAT is associated with a second network node.

27. A network node for wireless communication, comprising:
  a memory; and
  one or more processors coupled to the memory, the one or more processors configured to:
    initiate a communication session establishment procedure to enable a user equipment (UE), supporting a plurality of radio access technologies (RATs) including a narrowband (NB) RAT and a non-NB RAT, to connect using the non-NB RAT, wherein the non-NB RAT corresponds to a UE radio capability identifier identified during the communication session establishment procedure;
    query a RAT capability of the UE;
    receive, during signaling of the communication session establishment procedure and as a response to querying the RAT capability of the UE, a communication session establishment message,
      wherein the communication session establishment message includes the UE radio capability identifier, or does not include the UE radio capability identifier, based at least in part on the UE supporting radio capability signaling (RACS) optimization for the non-NB RAT; and
    determine, based at least in part on a result of receiving the communication session establishment message including the UE radio capability identifier, a network capability of the UE.

28. The network node of claim 27, wherein the UE radio capability identifier indicates a set of RATs, supported by the UE, including the non-NB RAT.

29. The network node of claim 27, wherein the one or more processors are further configured to:
  receive the UE radio capability identifier as a particular response to a query for a RAT capability of the UE.

30. The network node of claim 27, wherein at least one of:
  the non-NB RAT is a wideband evolved universal mobile telecommunications system (UMTS) terrestrial radio access (WB-E-UTRA) RAT or a new radio (NR) RAT,
  the NB RAT is a NB internet-of-things (IoT) RAT, or
  the non-NB RAT is associated with a first network node and the NB RAT is associated with a second network node.

* * * * *